United States Patent [19]

Delatorre

[11] Patent Number: 5,749,417
[45] Date of Patent: May 12, 1998

[54] PRODUCTION LOG

[75] Inventor: Leroy C. Delatorre, League City, Tex.

[73] Assignee: Panex Corporation, Sugar Land, Tex.

[21] Appl. No.: 610,759

[22] Filed: Mar. 5, 1996

[51] Int. Cl.$^6$ .................................................. E21B 47/06
[52] U.S. Cl. ............................ 166/254.2; 166/250.07
[58] Field of Search .......................... 166/254.2, 254.1, 166/250.02, 250.07

[56] References Cited

U.S. PATENT DOCUMENTS

| | | | |
|---|---|---|---|
| 3,550,445 | 12/1970 | Kiel | 166/250.02 |
| 4,423,625 | 1/1984 | Bostic, III et al. | 166/250.02 |
| 5,040,414 | 8/1991 | Graebner | 73/152.59 |
| 5,251,286 | 10/1993 | Wiener et al. | 395/22 |
| 5,354,956 | 10/1994 | Orban et al. | 181/105 |
| 5,413,179 | 5/1995 | Scott, III | 166/308 |

*Primary Examiner*—Frank Tsay
*Attorney, Agent, or Firm*—Donald H. Fidler

[57] ABSTRACT

A production log which is developed by data recorded in a downhole memory in a well tool as a function of real time and data recorded at the earth's surface as a function of time and merged to produce a log of data as a function of depth. The well tool is moved with a velocity selected to obtain fluid velocity data as a function of time and the velocity of the tool is measured at the earth's surface as a function of time. The functions of time are on a common basis so that a true velocity of fluid flow can be obtained as a function of depth.

12 Claims, 2 Drawing Sheets

PRODUCTION LOG

FIELD OF INVENTION

This invention relates to production logging systems for oil wells, and more particularly, to a system for developing production data relative to a well bore where the data is correlated on a real time basis and displayed as a function of depth.

BACKGROUND OF THE INVENTION

Production logging of oil wells which traverse earth formations generally involves obtaining data from a well bore as a function of depth by independent production logging tools such as a flowmeter, a pressure gauge and a temperature log. This data is plotted as a function of depth and called a production log and is utilized in the evaluation of a reservoir. The depth recording is obtained by a surface depth recorder and correlated to casing collars in the liner. There is a problem obtaining flow measurements for low flow rates, for mixed hydrocarbon flows and for perforations as well as correlating the flow rates to the depth of measurement.

Flowmeters require the positioning of flowmeter in the bore of a liner in a well bore and measurement of flow is at a given depth for the flowmeter. Continuous flowmeters with a spinner are used in high flow rates usually above 300/400 barrels per day of single phase flow for injection or production profiles. Spinner flowmeters are subject to mechanical limitations such as response time due to momentum.

A packer flowmeter with a spinner is utilized to determine the relative production contribution for production zones in low velocity situations. The packer is set at a fixed location and channels the flow through the tool. With a packer tool, a densimeter can be used to obtain average density of fluids passing through the tool.

A gradiomonometer can be used to obtain measurements of specific gravity by measuring a pressure drop between pressure sensors in a production tool; a temperature gauge to obtain a temperature profile; a gamma ray tool to obtain a profile of the earth formations as well as travel pats of injected fluids behind the timer. Because various production data is obtained by separate production logging operations at different times, the data must be merged by correlating depth measurements.

The combination of pressure, temperature and flow are interrelated factors which are utilized to evaluate the productivity of a well. Obviously, these factors can be incorrectly interrelated if the merger of logs is in error and is inaccurate.

SUMMARY OF THE INVENTION

In the present invention, production data of temperature, pressure, flow and other parameters are obtained on a common real time basis in a single pass of a well tool through a well bore. The production of the depth data of the tool and the velocity data of the tool moving through the well bore are obtained on a real time basis at the earth's surface. The downhole data and the surface data are correlated on a real time basis and displayed as a function of depth.

A production logging tool for the present invention incorporates a pressure gauge, a temperature gauge and a non-spinner torque flowmeter. The pressure gauge, the temperature gauge and the flowmeter are disposed in the well bore by a wireline and respectively develop data as a function of real time on a common time basis which is stored in the tool in a memory. At the earth's surface, a wireline unit obtains a record of the depth of the tool and the velocity of the tool as a function of real time.

The flowmeter is a movement responsive device wherein a torque responsive impeller on the tool is utilized to determine the rate of fluid flow past the impeller as a function of real time. The tool is moved at a selected velocity or line speed through the well bore and fluid flow past the impeller is measured. The selected velocity or line speed is obtained by the wireline unit at the earth's surface where the wireline unit moves the tool through the wellbore at a determined rate of movement or velocity which is recorded as a function of real time. It should be appreciated that even though the operator regulated the line speed, the line speed will vary but with the present invention the velocity is determined or recorded as a function of the real time so that variations in speed are recorded as a function of time. The depth of the tool is recorded as a function of real time.

The flowmeter measurement of velocity of fluid flow in the well tool is comprised of two components, i.e., the velocity of fluid flow in the well bore plus the velocity of the tool in the well bore.

The surface parameters of velocity of the tool and depth of the tool as a function of real time are combined with the downhole parameters as a function of real time with the velocity of the tool being subtracted from the measured or indicated flow velocity measured by the tool to give actual flow velocity and a recording of the parameters as a function of depth.

BRIEF DESCRIPTIONS OF THE DRAWINGS

FIG. 3 shows the torque measurements corresponding to the indicated flow range.

DESCRIPTION OF THE INVENTION

Figure 1:
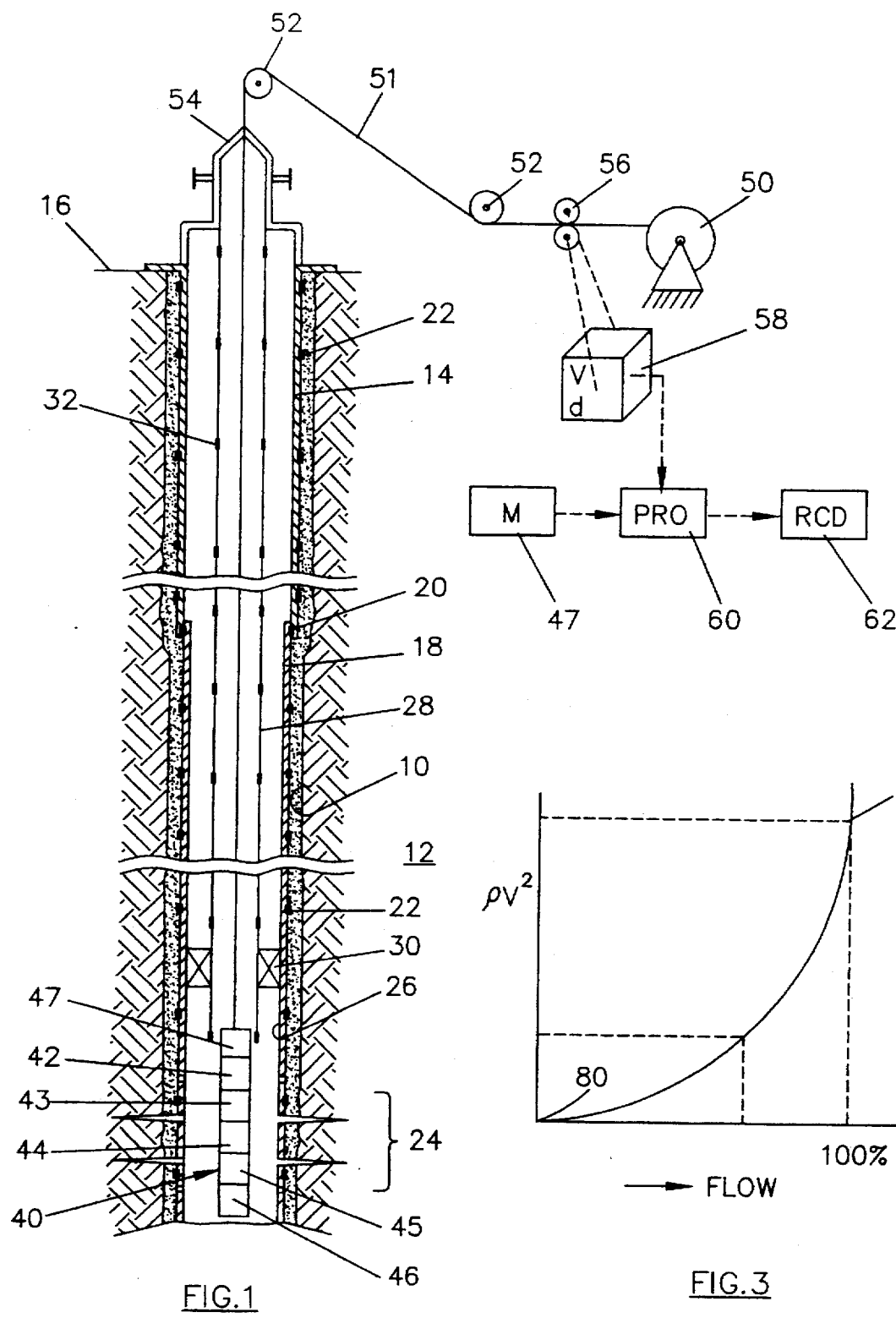
FIG. 1 is a schematic of a production well having a wireline tool of the current invention.

Referring now to FIG. 1, there is a schematic representation of a production well where a well bore 10 which traverses earth formations 12. A surface casing 14 extends through the well bore 10 from the earth's surface 16 and one or more liners 18 are located in the well bore 10 and traverse the earth formations 12. The casing 14 and the liners 18 are cemented in place in the well bore and the liners 18 are hung in a casing or liner bore by a liner hanger 20. The casing 14 and the liners 18 are typically comprised of lengths of pipe which couple to one another at joints 22 which are commonly referred to as "casing collars".

At various times during the drilling of a well bore, various logs are made of the earth's formations as a function of depth. From the logs and available data, the earth formations are characterized so that production zones of producible hydrocarbons in a reservoir can be defined. Upon definition of a production zone of earth formations such as zone 24, the operator installs a casing and liner for the well bore. The well is completed by perforating the liner at the zone 24 to access the earth's formations to the bore 26 of the liner to allow production of hydrocarbons from the reservoir production zone or reservoir in the earth formations to the bore 26 in the liner. A production string of tubing 28 is disposed in the wellbore and extends from the earth's surface 16 to the production zone 24. A production packer 30 on the string of tubing 28 directs flow of hydrocarbons from the bore 26 of the liner to the earth's surface. The string of tubing 28 is also in lengths of pipe which couple together at joints 32. The length of the string of tubing 28 and the positioning of the production packer 30 are determined by the depth of the production zone 24 which in turn is determined from the various logs of the earth's formations.

In virtually all logging operations, it is usual to obtain a gamma ray log which is a plot of gamma radiations in the earth formation as a function of depth together with a log of the tubing collars and casing collars below the end of the tubing. The gamma ray log provides a basis for correlation of depth for various logs of the earth formations taken at different times in a well bore relative to the casing and tubing collars.

It is of considerable economic importance to the well operator to determine the production rate of hydrocarbons as a function of depth, together with pressure and temperature so that the dynamic reservoir parameters can be defined. For example, along a production zone, perforations can be producing water and/or water-hydrocarbon mixtures or even be non-producing. Because of the complex mixture of hydrocarbons which are produced under downhole pressure and temperature conditions, many times there are dissolved gases in the fluid flow. The dissolved gases can change phase as the hydrocarbons flow up the borehole and the pressure decreases. For that and other reasons, it is important to have correct dynamic parameter measurements at various depths for the production zone. One of the difficulties with conventional flowmeters is that they do not function reliably in a casing or liner where the production exists and obtain inaccurate measurements in a production string of tubing and typically can not measure low flow rates in a large diameter liner.

In the present invention, a wire line tool 40 is sized for passage through a tubing string and is provided with a gamma ray unit 42, a casing collar locator 43, a flowmeter 44, a temperature gauge 45 and a pressure gauge 46. The flowmeter 44 is of the type disclosed in U.S. Pat. No. 5,463,963, issued Nov. 7, 1995, where a stationary impeller is responsive to a flow of fluid past the impeller to develop a torque measurement as a function of fluid flow or velocity. Pressure and temperature are measured with a device such as illustrated in U.S. Pat. No. 5,463,963. Gamma ray tools and casing collar locators are also conventional and readily available. The various measuring units in the well tool are connected to a memory system 47 in the tool which records the various data measurements as a function of real time, i.e. time which is compatible to the time standard at the well site or other predetermined time reference.

At the earth's surface, a wireline spool 50 has a wireline 51 which is attached to the production tool 40 in the wellbore. The wireline 51 is guided by sheaves 52 through a Christmas tree 54. A wireline measuring wheel unit 56 is coupled to a depth encoder and recorder 58 which has a predetermined time reference so that the speed of the wireline is determined by the depth measurement as a function of real time and the depth is recorded as a function of real time.

Figure 2:
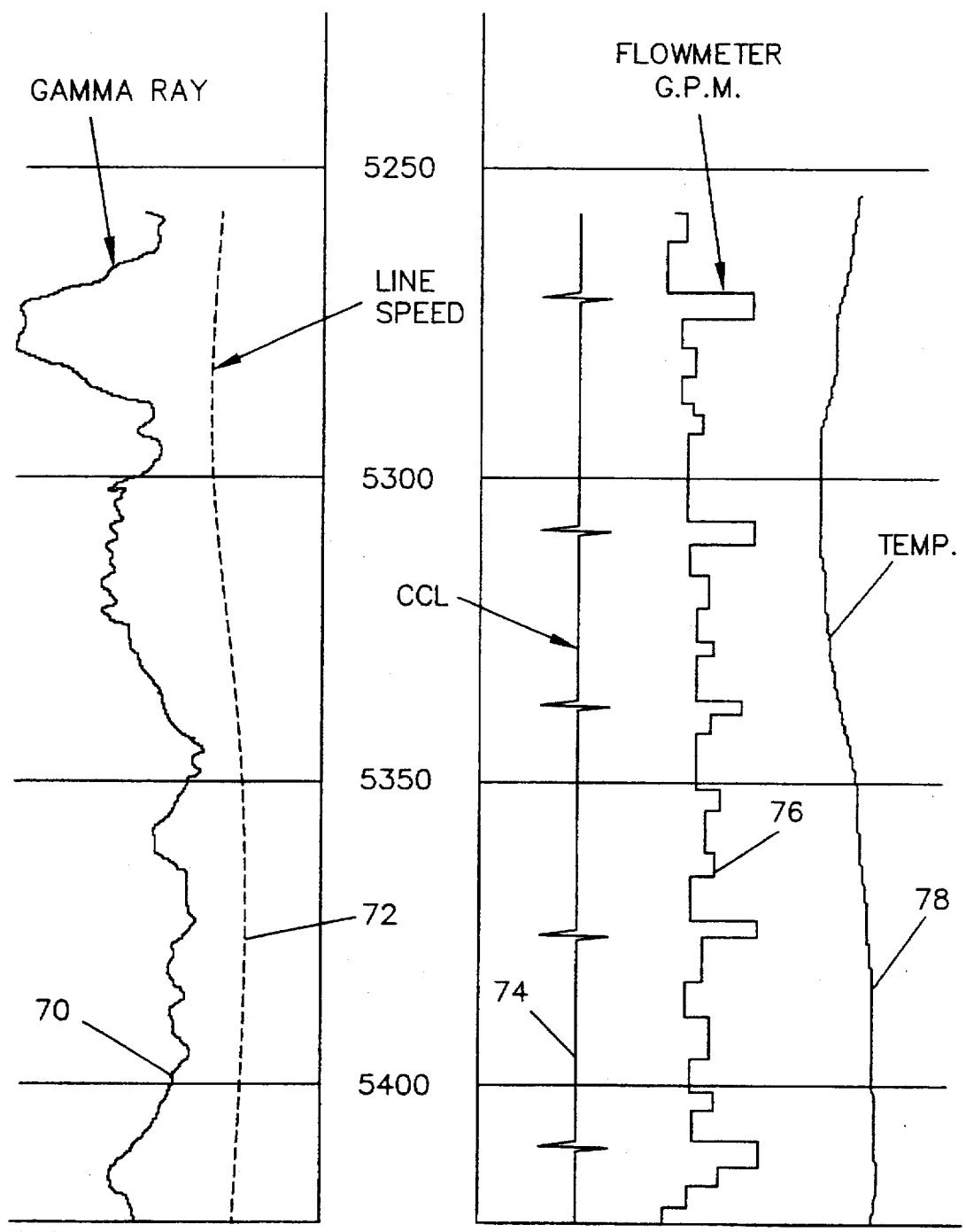
FIG. 2 shows an example of a recorded well log.

The production tool 40 is first located in the well bore below the production zone of interest. Then the tool 40 is raised at a velocity or speed which is encoded and recorded at the earth's surface as a function of real time in the data encoder 58. The depth is also recorded in the date encoder 58 as a function of time. Concurrently, the tool 40 records in the memory unit 47, the gamma ray data, the casing collar data, the flowmeter data, the pressure data and the temperature data as a function of real time. The production tool 40 is moved through the interval of interest and retrieved from the wellbore. In this process then, production data as a function of real time is obtained by the tool while at the surface, depth and velocity data are obtained as a function of real time. The downhole date and the surface data are merged on the real time basis in a processor 60 and are and displayed or recorded as a function of depth in a recorder 62. An example of a recorded log is illustrated in FIG. 2 with gamma ray data 70, line speed data 72, casing collar data 74, flowmeter data 76 and temperature data 78 displayed as a function of depth but all of the data is correlated to the same time basis.

The flowmeter 44 has a torque measurement which is a function of velocity of fluid flow. A plot of the responses of the torque measurement as a function of velocity is shown in FIG. 3. The relationship of flow velocity to torque is as follows:

$$\text{indicated flow velocity } (V) = \sqrt{\frac{T}{K\rho}}$$

where T is the torque measurement;

K is a constant; and $\rho$ is the fluid density

As shown in FIG. 3, the torque measurement provides an indicated flow range between a zero point 80 and a 100% flow point 82 as a function of the fluid flow relationship "$\rho v^2$".

The effect of the square root in the relationship is that any change in the sensor torque measurement due to temperature or zero stability errors has a large effect when the measurements are close to zero. For example, at 100% flow rate the torque sensor output is 100% but at a 1% of full scale flow rate, the torque sensor output is 0.01% of it's full scale. Thus, if a flow rate is at 1% and a temperature error introduces a change of 0.01% of full scale in the sensor, there is a 100% of value error or 1.0% of full scale in this low flow rate reading. Conversely, the same 0.01% error will only introduce an error of 0.005% at full scale.

To obtain a more accurate reading of such a low flow rate, in the present invention the tool is moved through the well bore with a velocity which is additive to the fluid flow velocity measured by the flowmeter. For example, if the tool is moved with sufficient velocity that the indicated velocity of fluid flow is 10% of the sensor output, then a change of 0.01% due to temperature induced error will change the indicated flow rate from 10% to 10.05% or 0.05%. This is a reduction in error of 28:1. This reduction of the error in a measurement of low flow can be made so long as the added velocity is maintained constant to much less than this error and the sensor resolution is adequate for low flow measurements. It is also desirable to have the response time of the flow sensor fast enough to sense flow changes as the tool is moved through the well bore.

With a torque flowmeter as disclosed in U.S. Pat No. 5,463,963, there is no momentum to overcome as in a spinner flowmeter, and the flowmeter has a high resolution with fast response. With the foregoing principle in mind, if the tool 40 is moved with an added velocity through the well bore, then the torque measurement T or indicated flow $F_1$ can be stated as follows:

$$T = K\rho(V_F + V_T)^2$$

where $V_F$ = fluid flow velocity
$V_T$ = velocity of the tool $$F_I = \sqrt{T} = \sqrt{K_\rho} \ (V_F + V_T)$$

But $$F_R = \sqrt{K_\rho} \ V_F$$

Therefore $$F_R = F_I - \sqrt{K_\rho} \ V_T$$

The real flow $F_R$ of the fluid in the well bore is obtained by subtracting the tool velocity $V_T$ from the indicated flow.

In practicing the present invention, the operator moves the well tool at a sufficient tool velocity to provide an operating range for the sensor at as far away from zero as possible but at a level low enough so that uncorrected velocity variations do not mask the flow information. Uncorrected velocity variations can occur because stretch in the line can cause instantaneous furnace velocity measurements to differ slightly from the actual tool velocity. Then, after recovering the well tool, the tool velocity is subtracted from the combined velocity measurement so that the actual fluid velocity is determined.

In the present invention, the operator determines a suitable tool velocity for a combined velocity measurement to obtain a combined velocity measurement with a minimized error factor. For example, from a chart or a calculation, the operator can determine velocity of fluid flow for a given size of tubing or casing and production rate. As illustrated in the following chart, values of fluid flow are given for various diameters of pipe for various flow velocities.

| | | | FLUID VELOCITY VS FLOW RATE IN COMMON TUBING AND CASING | | | |
|---|---|---|---|---|---|---|
| TUBING/ CASING SIZE | DRIFT DIA (INCHES) | NOM AREA (IN^2) | NOM AREA (FT^2) | VELOCITY PER BBL/DAY FT/MIN | VELOCITY AT 100 BBL/DAY | VELOCITY AT 200 BBL/DAY |
| 2.375 | 1.90 | 2.84 | 0.02 | 0.20 | 19.78 | 39.56 |
| 2.875 | 2.17 | 3.68 | 0.03 | 0.15 | 15.25 | 30.50 |
| 3.5 | 2.63 | 5.41 | 0.04 | 0.10 | 10.37 | 20.74 |
| 5.5–36.4 | 3.97 | 12.35 | 0.09 | 0.05 | 4.55 | 9.09 |
| 5.5–26 | 4.42 | 15.36 | 0.11 | 0.04 | 3.65 | 7.31 |
| 5.5–14 | 4.89 | 18.76 | 0.13 | 0.03 | 2.99 | 5.99 |
| 7.675–39 | 6.50 | 33.18 | 0.23 | 0.02 | 1.69 | 3.38 |
| 7.675–26 | 6.84 | 36.79 | 0.26 | 0.02 | 1.53 | 3.05 |
| 9.675–54 | 8.38 | 55.14 | 0.38 | 0.01 | 1.02 | 2.04 |
| 9.675–43 | 8.60 | 58.07 | 0.40 | 0.01 | 0.97 | 1.93 |
| 9.675–36 | 8.77 | 60.34 | 0.42 | 0.01 | 0.93 | 1.86 |
| TUBING/ CASING SIZE | VELOCITY AT 300 BBL/DAY | VELOCITY AT 400 BBL/DAY | VELOCITY AT 500 BBL/DAY | VELOCITY AT 600 BBL/DAY | VELOCITY AT 700 BBL/DAY | VELOCITY AT 800 BBL/DAY |
| 2.375 | 59.35 | 79.13 | 98.91 | 118.69 | 138.47 | 158.25 |
| 2.875 | 45.75 | 61.01 | 76.26 | 91.51 | 106.76 | 122.01 |
| 3.5 | 31.11 | 41.48 | 51.85 | 62.22 | 72.59 | 82.96 |
| 5.5–36.4 | 13.64 | 18.19 | 22.74 | 27.28 | 31.83 | 36.38 |
| 5.5–26 | 10.96 | 14.62 | 18.27 | 21.93 | 25.58 | 29.23 |
| 5.5–14 | 8.98 | 11.97 | 14.97 | 17.96 | 20.95 | 23.95 |
| 7.675–39 | 5.08 | 6.77 | 8.46 | 10.15 | 11.84 | 13.54 |
| 7.675–26 | 4.58 | 6.10 | 7.63 | 9.16 | 10.68 | 12.21 |
| 9.675–54 | 3.05 | 4.07 | 5.09 | 6.11 | 7.13 | 8.15 |
| 9.675–43 | 2.90 | 3.87 | 4.83 | 5.80 | 6.77 | 7.73 |
| 9.675–36 | 2.79 | 3.72 | 4.65 | 5.58 | 6.51 | 7.44 |
| TUBING/ CASING SIZE | VELOCITY AT 900 BBL/DAY | VELOCITY AT 1000 BBL/DAY | VELOCITY AT 2000 BBL/DAY | VELOCITY AT 3000 BBL/DAY | VELOCITY AT 4000 BBL/DAY | VELOCITY AT 5000 BBL/DAY |
| 2.375 | 178.04 | 197.82 | 395.63 | 593.45 | 791.27 | 989.09 |
| 2.875 | 137.26 | 152.51 | 305.03 | 457.54 | 610.06 | 762.57 |
| 3.5 | 93.33 | 103.70 | 207.40 | 311.09 | 414.79 | 518.49 |
| 5.5–36.4 | 40.92 | 45.47 | 90.94 | 136.42 | 181.89 | 227.36 |
| 5.5–26 | 32.89 | 36.54 | 73.08 | 109.63 | 146.17 | 182.71 |
| 5.5–14 | 26.94 | 29.93 | 59.87 | 89.80 | 119.73 | 149.66 |
| 7.675–39 | 15.23 | 16.92 | 33.84 | 50.76 | 67.68 | 84.60 |
| 7.675–26 | 13.74 | 15.26 | 30.52 | 45.79 | 61.05 | 76.31 |
| 9.675–54 | 9.16 | 10.18 | 20.36 | 30.55 | 40.73 | 50.91 |
| 9.675–43 | 8.70 | 9.67 | 19.34 | 29.00 | 38.67 | 48.34 |
| 9.675–36 | 8.37 | 9.31 | 18.61 | 27.92 | 37.22 | 46.53 |

To use the chart, the velocity of fluid flow is first determined. For example, with a 3.5 inch tubing at 100 BBL/day, the velocity is (10.37×0.10) or 1.37 ft./min. The operator then determines a velocity value Vmr relative to the measurement range of the flowmeter. The tool is then moved through the well bore at a velocity of Vmr+or −1.37 ft./min. (depending upon the direction of movement) while the data recordings are made. The velocity value Vmr is selected to be as fast as possible relative to the expected fluid flow which decreases the effect of error in the tool. This is balanced, however with the fluid flow because the lower the flow rate in the well bore, the lower the speed of the well tool should be so that the accuracy of the measurements are maintained relative to line mechanical speed fluctuations. At the earth's surface a recorder determines tool velocity as a function of real time. The tool is raised through the well bore at the determined velocity which is recorded as a function of real time as is the depth.

When the tool is retrieved to the earth's surface, the recording of the downhole parameters as a function of real time are merged with the surface parameters as a function of real time and the velocity of the fluid flow is obtained by subtracting the tool velocity from the combined fluid velocity in the processor 60. The various parameters are recorded or displayed as a function of depth on the recorder or data device 62. From the recorded velocity, the record indicates the flow velocity of the fluids in the well bore as a function of depth.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A method of correlating production data from a well bore of a producing well traversing earth formations comprising the steps of:
   disposing a well tool in the well bore on a wireline and collecting data in a memory in the well tool as a function of real time where said data includes pressure, temperature, fluid flow velocity and depth;
   moving said well tool along said well bore with a surface located wireline means connected by wireline to the well tool;
   measuring the velocity of the tool movement of the wireline as a function of real time;
   measuring the depth of the well tool as a function of real time;
   removing the well tool from the well bore: and
   combining the velocity of the tool movement measured on the real time basis with the fluid flow velocity indicated in the well tool on the real time basis and extracting an actual velocity of fluid flow in the well bore from the velocity of the tool movement.

2. The method as set forth in claim 1 and further including the step of combining the depth data of the tool movement measured on the real time basis with the depth data indicated in the well tool on the real time basis and displaying the actual velocity of fluid flow as a function of depth.

3. The method as set forth in claim 2 wherein the fluid flow velocity is measured by a torque responsive flowmeter and further including the step of collecting the depth data by detecting casing collars.

4. The method as set forth in claim 3 and including the step of moving the well tool with a velocity selected to develop a fluid flow velocity measurement in data range relative to the zero point of measurement by the flowmeter which does not mask the response of the torque responsive flowmeter to the actual fluid flow.

5. The method as set forth in claim 4 and further including the step of displaying the actual velocity of fluid flow as a function of depth.

6. The method as set forth in claim 5 and further including the step of combining the pressure and temperature data obtained on a real time basis with the depth data of the tool movement measured on the real time basis with the depth data indicated in the well tool on the real time basis and displaying the pressure and temperature as a function of depth.

7. A method of correlating production data from a well bore of a producing well traversing earth formations comprising the steps of:
   disposing a well tool in the well bore on a wireline and collecting data in a memory in the well tool as a function of real time where said data includes pressure, temperature, fluid flow velocity developed from a force responsive flowmeter having a range of response to fluid flow, and depth data developed by a correlating to fixed parameters extending along the length of the well bore;
   moving said well tool along said well bore for a predetermined distance with a surface located wireline means connected by wireline to the well tool;
   measuring the velocity of the tool movement of the wireline over said distance as a function of real time;
   measuring the depth of the well tool over said distance as a function of real time;
   removing the well tool from the well bore: and
   combining the velocity of the tool movement measured on the real time basis over said distance with the fluid flow velocity indicated in the well tool on the real time basis over said distance and extracting an actual velocity of fluid flow over said distance in the well bore from the velocity of the tool movement.

8. The method as set forth in claim 7 and further including the step of combining the depth data of the tool movement measured on the real time basis with the depth data indicated in the well tool on the real time basis and displaying the actual velocity of fluid flow as a function of depth.

9. The method as set forth in claim 8 wherein the fluid flow velocity is measured by a torque responsive flowmeter and further including the step of collecting the depth data by detecting casing collars.

10. The method as set forth in claim 9 and including the step of moving the well tool with a velocity selected to develop a fluid flow velocity measurement in data range relative to the zero point of measurement by the flowmeter which does not mask the response of the torque responsive flowmeter to the actual fluid flow.

11. The method as set forth in claim 10 and further including the step of displaying the actual velocity of fluid flow as a function of depth.

12. A method of correlating production data from a well bore of a producing well traversing earth formations comprising the steps of:
   disposing a well tool in the well bore on a wireline and collecting data in a memory in the well tool as a function of real time where said data includes pressure, temperature, and depth;
   moving said well tool along said well bore with a surface located wireline means connected by wireline to the well tool;
   measuring the depth of the well tool at the earth's surface as a function of real time;
   removing the well tool from the well bore: and
   combining the depth of the tool measured on the real time basis in the well tool with the depth of the tool measured on a real time basis at the earth's surface and displaying the pressure data as a function of depth.

* * * * *